Nov. 28, 1967   W. HOFFMANN   3,354,600
BUNDLING MACHINE
Filed Dec. 8, 1964   10 Sheets-Sheet 4
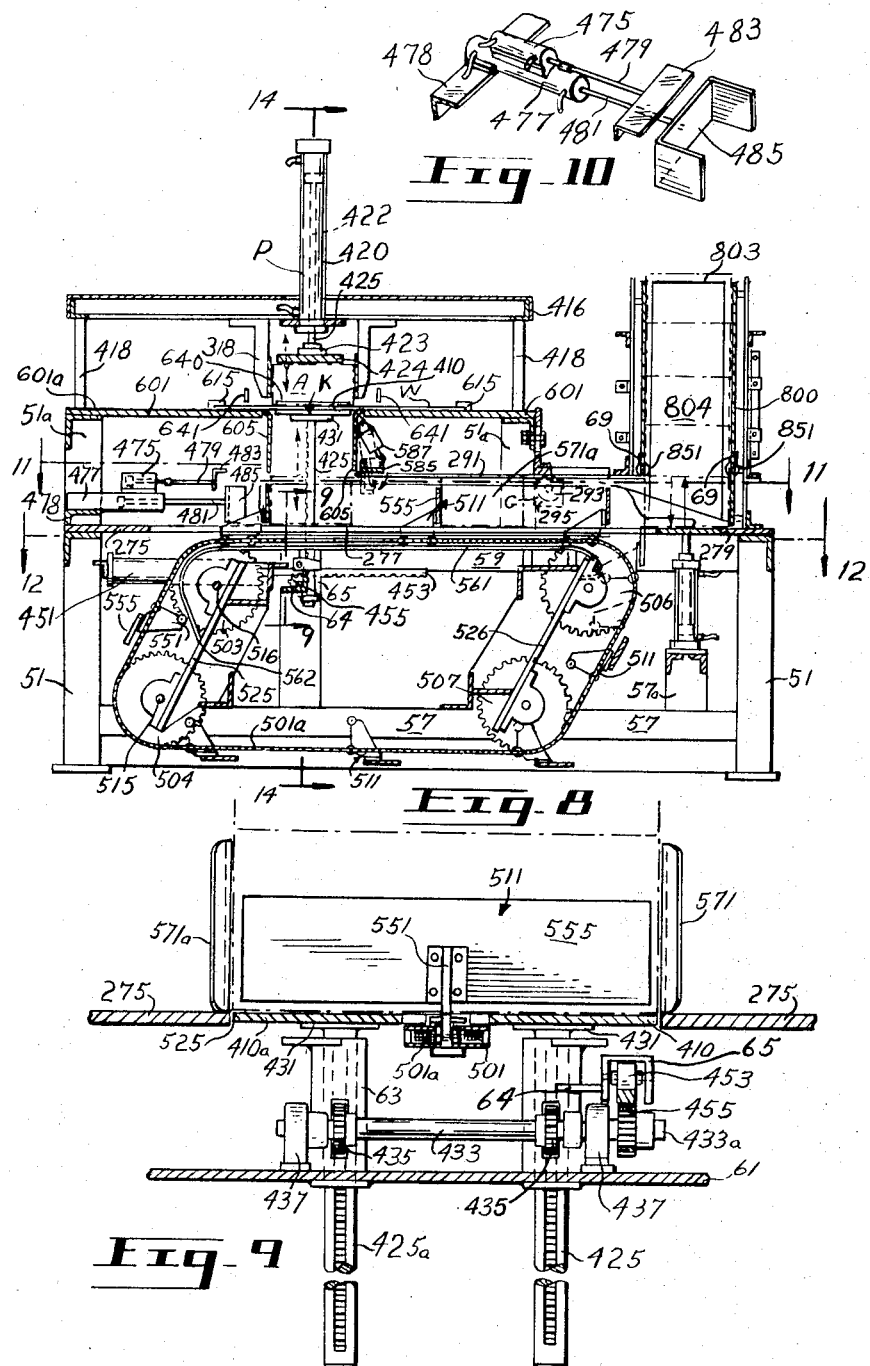
INVENTOR
Wolfgang HOFFMANN
BY
ATTORNEY INVENTOR
Wolfgang HOFFMANN
BY
ATTORNEY

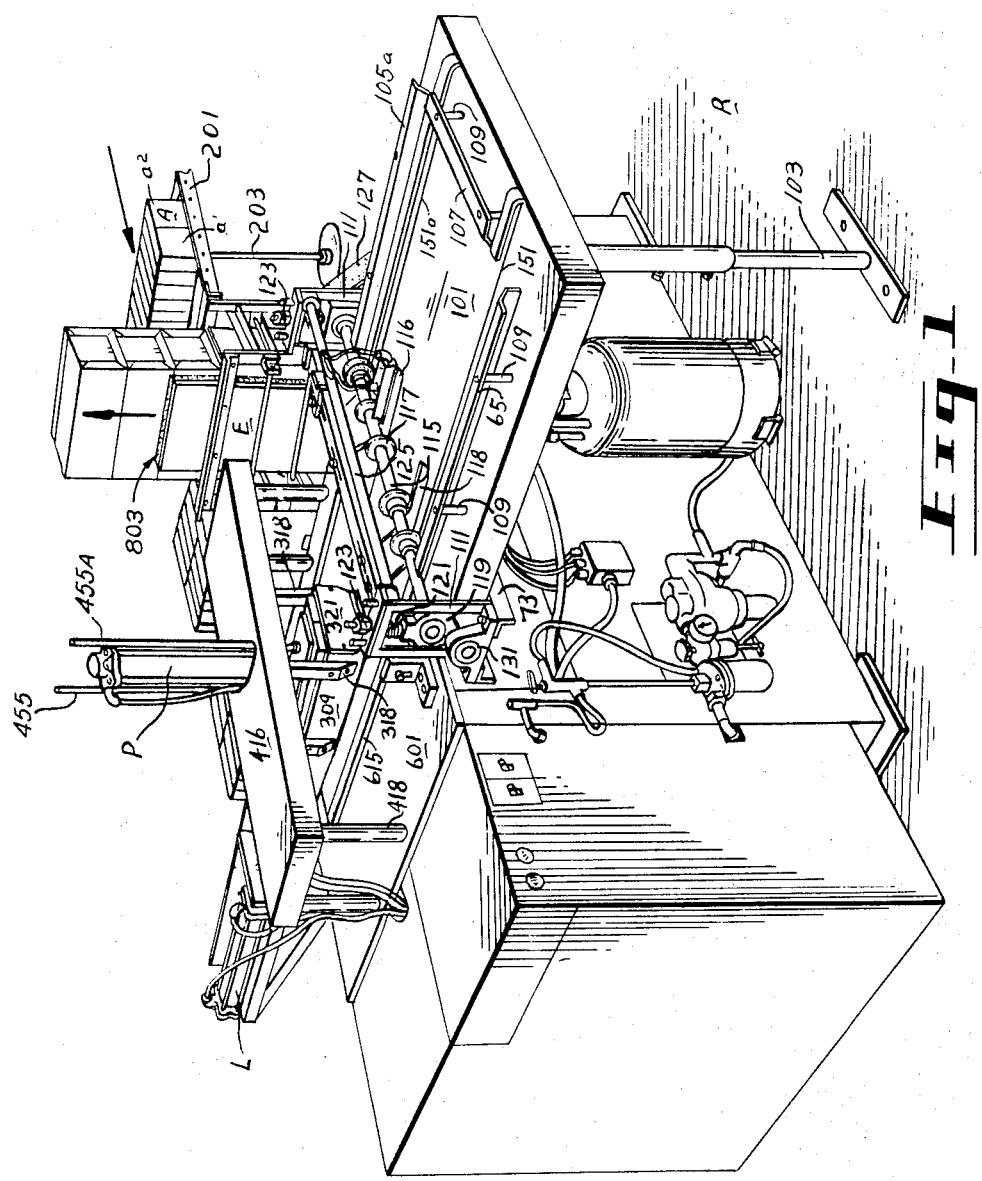

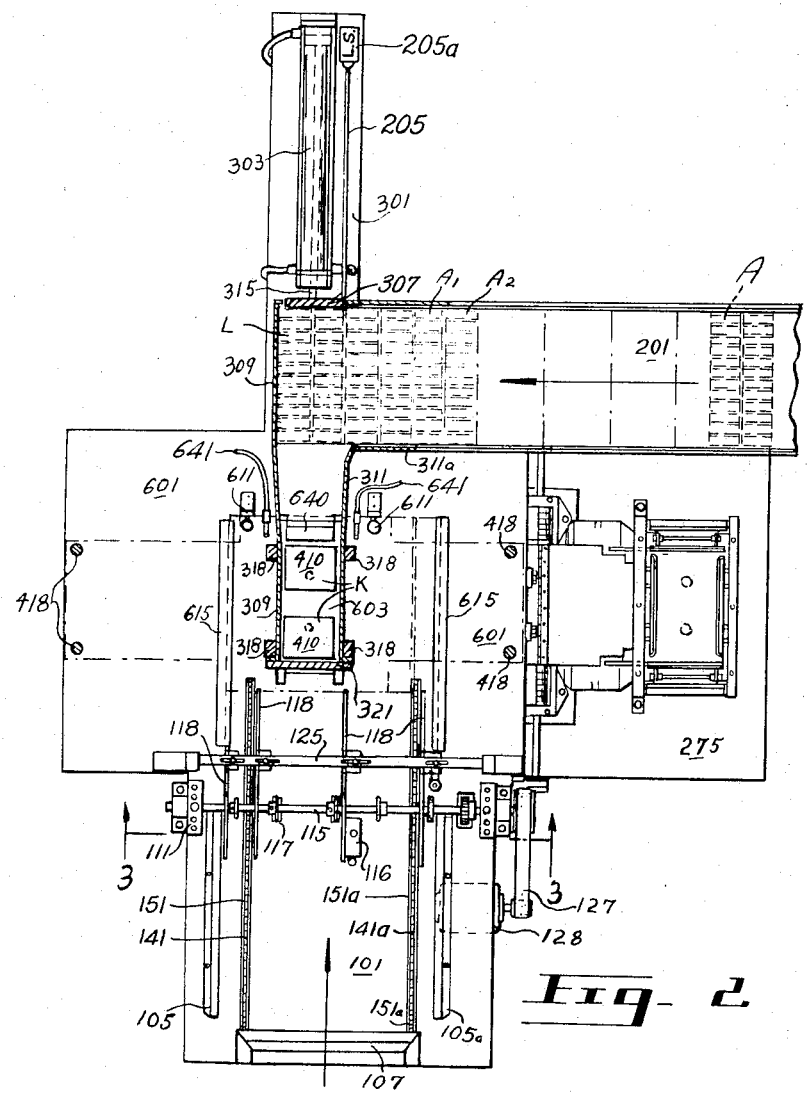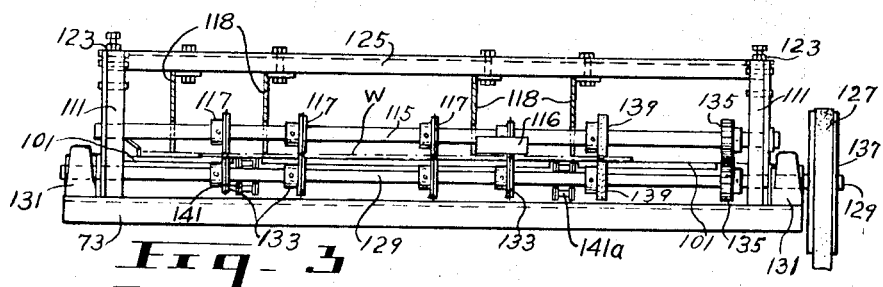

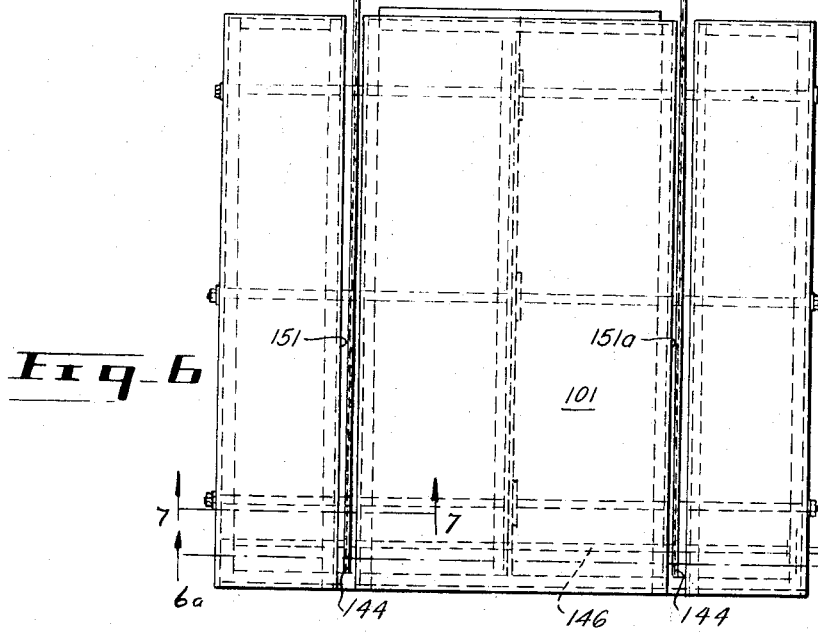

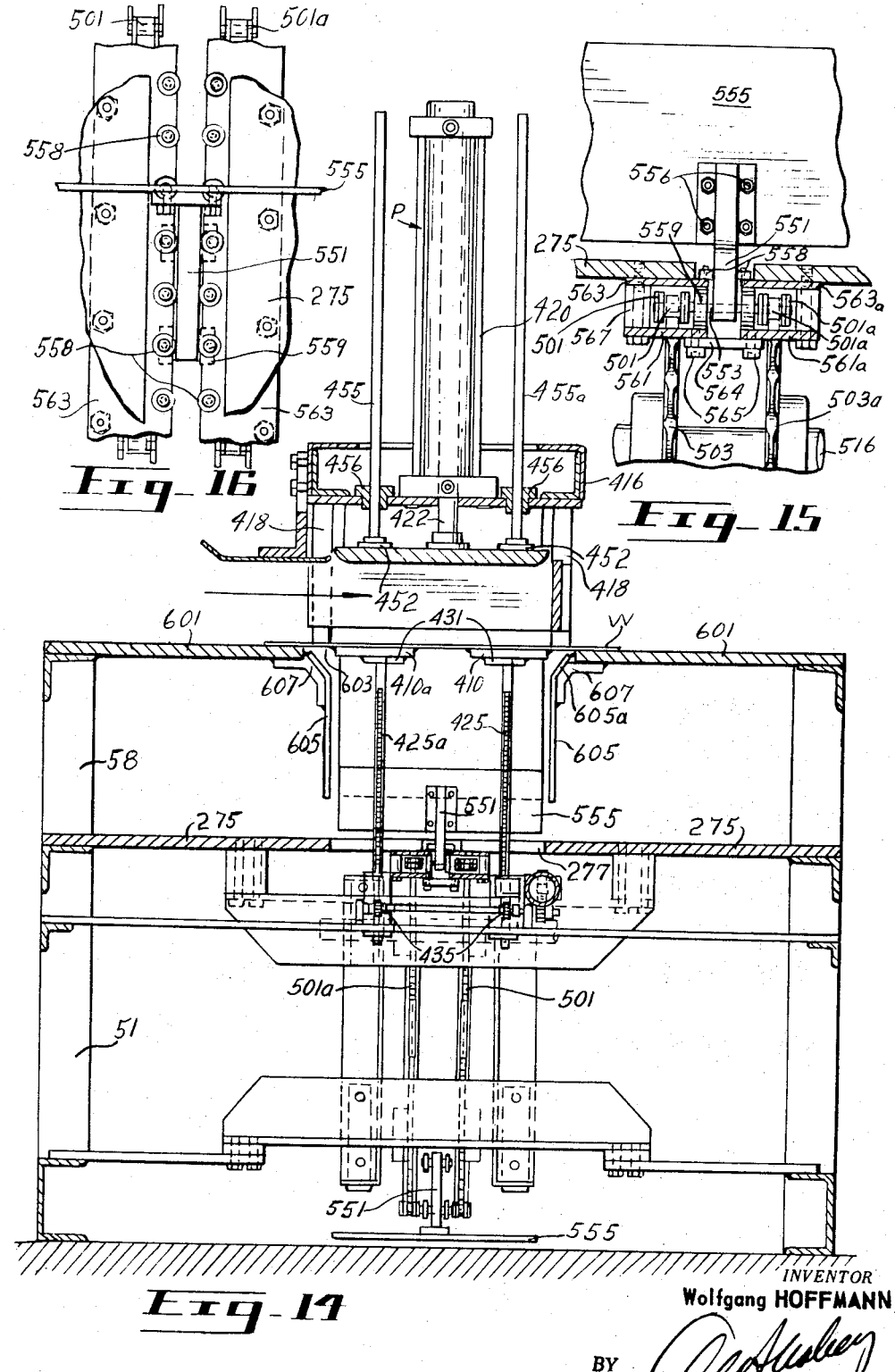

Nov. 28, 1967 W. HOFFMANN 3,354,600
BUNDLING MACHINE
Filed Dec. 8, 1964 10 Sheets-Sheet 7
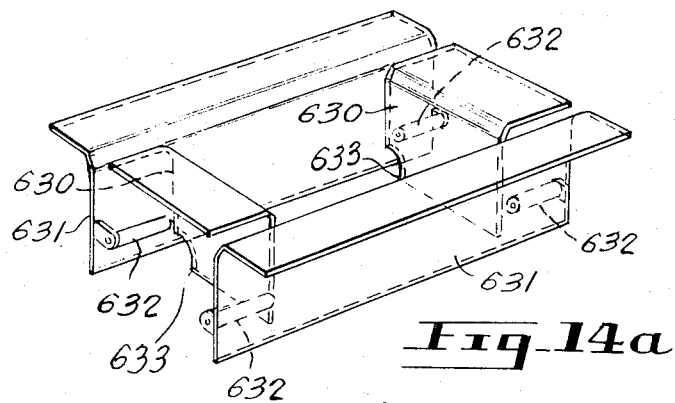
Fig. 14a
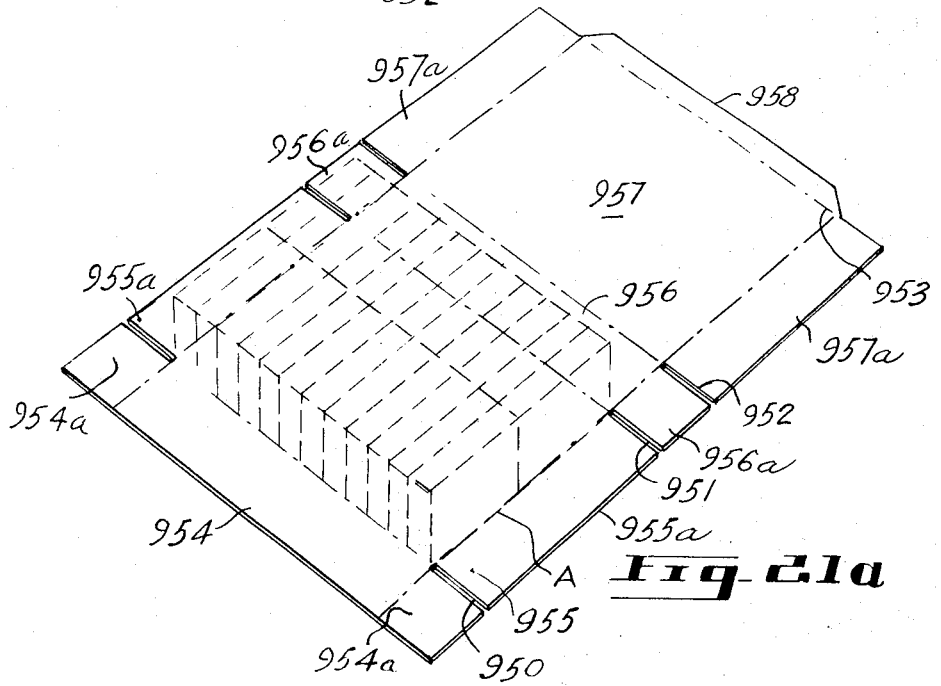
Fig. 21a
INVENTOR
Wolfgang HOFFMANN
BY 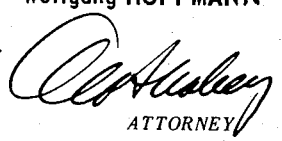
ATTORNEY

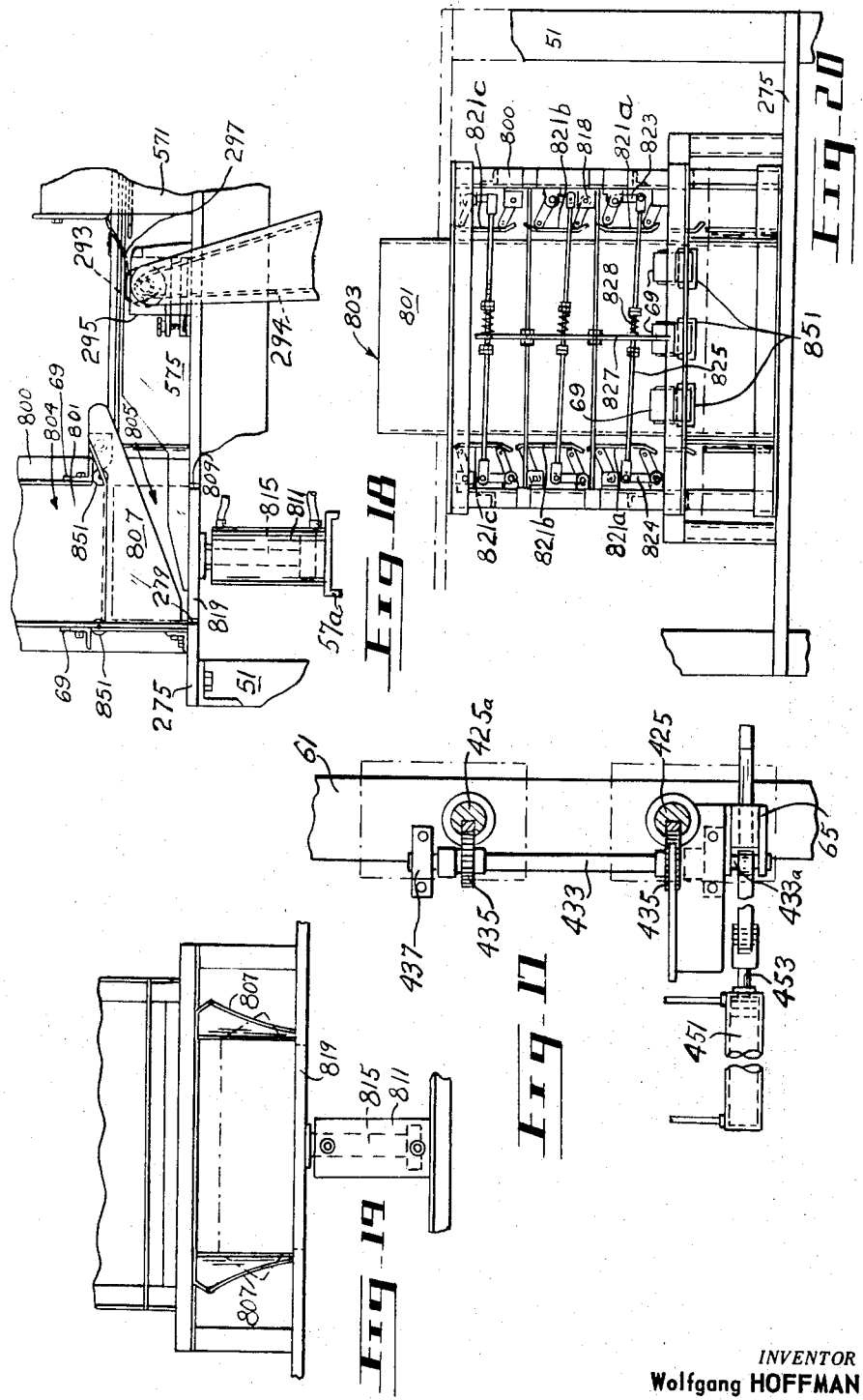

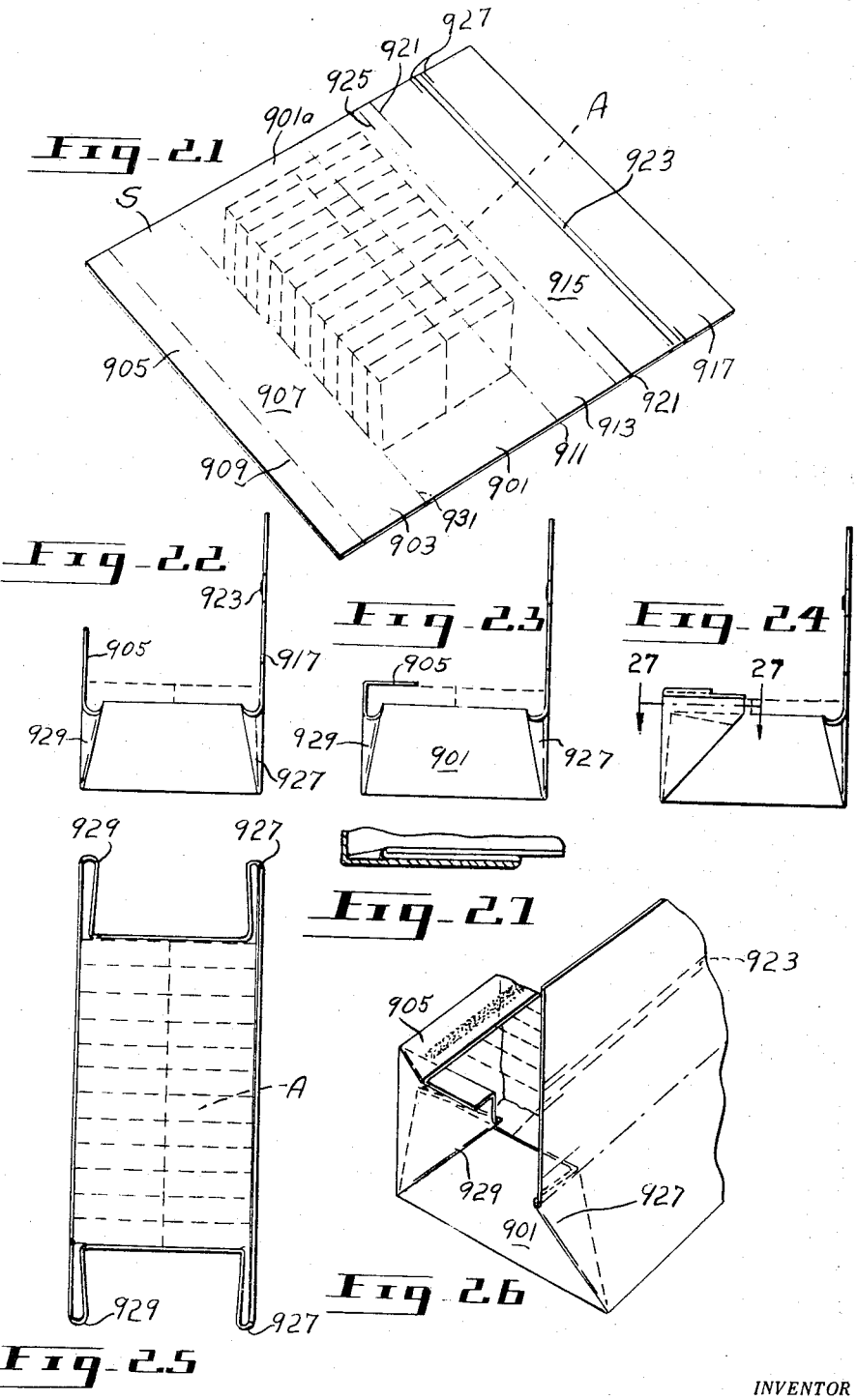

Nov. 28, 1967 — W. HOFFMANN — 3,354,600
BUNDLING MACHINE
Filed Dec. 8, 1964 — 10 Sheets-Sheet 10
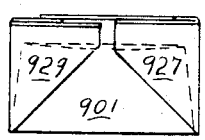
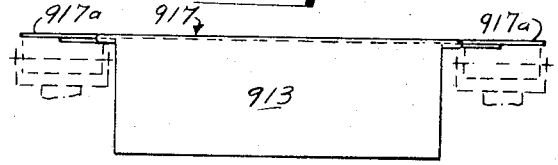
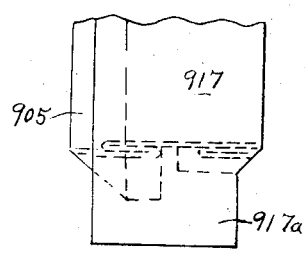
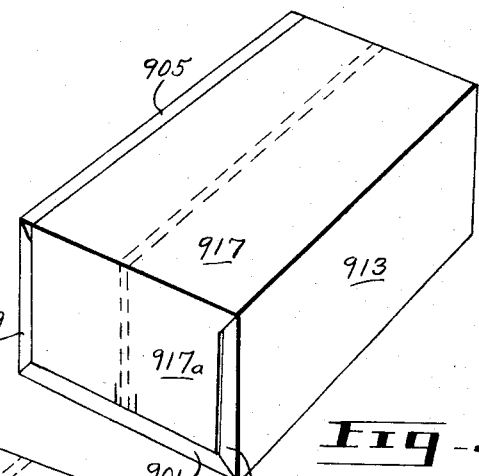
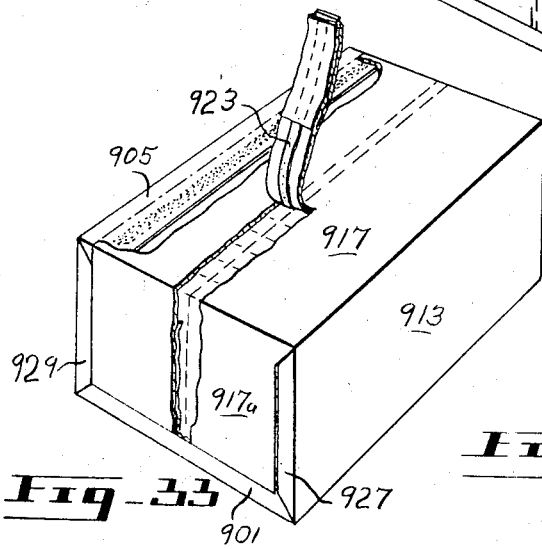
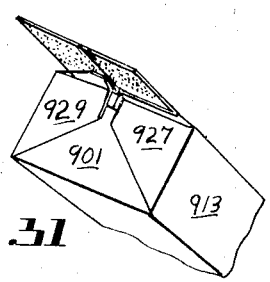
INVENTOR
Wolfgang HOFFMANN
BY 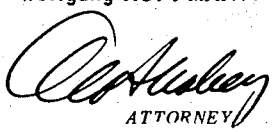
ATTORNEY United States Patent Office 3,354,600
Patented Nov. 28, 1967

3,354,600
BUNDLING MACHINE
Wolfgang Hoffmann, Montreal, Quebec, Canada, assignor, by mesne assignments, to International Paper Company, New York, N.Y.
Filed Dec. 8, 1964, Ser. No. 416,929
Claims priority, application Canada, Oct. 9, 1964, 913,682
27 Claims. (Cl. 53—24)

This invention relates to a method and apparatus for wrapping commodities and to a new package.

This invention readily lends itself to wrapping commodities under compression—"compression bundling"—but is also applicable to wrapping commodities not under compression.

There are many known methods and apparatuses for wrapping commodities under compression or otherwise. In general these methods wrap a commodity by applying a sheet of wrapping material to the top of a commodity, and subsequently juxtaposing the various side and bottom panels to respective sides and bottom of the commodity. More specifically, the commodity to be wrapped is placed on a platform which is adapted to be moved vertically upwardly between supporting members. These members are adapted to support the edges of the wrapping material and in use the platform moves upwardly to thrust the top surface of the commodity against the undersurface of the wrapping material. The commodity continues to move upwardly after contact between the material and the commodity, and is pushed into, for example, a downwardly open forming box, the depending edges of which juxtapose the wrapping material to the sides of the commodity. This box may be replaced by any frame which serves to urge the parts of the wrapping material against the sides of the commodity as the commodity moves upwardly with respect to the frame. Tranversely acting slides complete the wrapping by urging the flaps of material which project below the commodity inwardly against the underside of the commodity.

Depending on the type of wrapping material used, an apparatus adapted to carry out the method, such as described above, is not universal in handling the different types of wrapping material. Previously, it has required relatively complicated and expensive apparatus to wrap a commodity in different types of wrapping material.

Applicants have now developed a novel type of apparatus and method of wrapping commodities, which apparatus and method is relatively simple in operation and is capable of handling different types of wrapping material for wrapping different types of commodities.

The apparatus of this invention includes a frame, an elevator moveable between upper and lower stations on the frame, means for delivering a sheet of wrapping material to the elevator, means for placing a commodity on top of the sheet of wrapping material, means cooperating with the elevator for retaining a commodity in position on the sheet of wrapping material and means for juxtaposing the various panels of wrapping material to the respective sides and top of the commodity. The apparatus is adapted to be operated in intermittent time-related sequence, whereby a sheet of wrapping material is placed on the elevator, a commodity is delivered to the wrapping material, the elevator and its cooperating means lower the commodity and wrapping material from the upper to the lower station and the commodity and wrapping material are subjected to various wrapping operations to produce a wrapped commodity.

The apparatus is adapted to position and align a commodity of a sheet of wrapping material delivered to the elevator in a specific manner. More particularly, the means for delivering the commodity aligns the commodity on the wrapping material so as to leave wrapping material on all sides of the commodity sufficient to wrap its top and sides.

In a further embodiment of the apparatus aspect of this invention, there is provided means in advance of the lower station through which the commodity passes, which means are operative to juxtapose side and top panels of wrapping material to the commodity. A preferred embodiment of this aspect includes the provision of a guide channel on the lower station through which the commodity is advanced by commodity advancing means.

According to a still further embodiment, the apparatus includes means for receiving and retaining a commodity from the guide channel as it is advanced therethrough by the commodity advancing means.

According to a further aspect of this invention, a method of packaging a commodity includes the steps of providing a sheet of wrapping material, placing a commodity on the wrapping material in a manner hereinafter described, and juxtaposing the various panels of wrapping material to the commodity to produce a wrapped commodity. More specifically, the commodity is placed on the sheet of wrapping material and aligned thereon to provide wrapping material on all sides of the commodity having a sufficient length and width to completely cover the commodity.

The commodity is arranged on the sheet so as to leave on each transverse side of the commodity a pair of transverse side panels each less in width than the height of the commodity and on each of the other two sides of the commodity longitudinal panels which are each at least as wide as the height of the commodity and which, when considered together, are wider than twice the height plus the width of the commodity so that when wrapped around the commodity these longitudinal panels overlap one another. The four panels are then juxtaposed adjacent the respective sides of the commodity so that the longitudinal panels project above the commodity and form longitudinal flaps. The juxtaposition of the four panels results in the formation of four corner webs which are subsequently juxtaposed adjacent the transverse side of the commodity. The longitudinal flaps are then turned over so that they overlay the top of the commodity and project beyond the transverse sides of the commodity to form four smaller flaps which can be called longitudinal transverse flaps. The final stage is to juxtapose these longitudinal transverse flaps against the side panels which already lay against the transverse sides of the commodity.

The invention, as mentioned above, also provides a new package. This new package has one wall formed from a continuous panel of wrapping material, that is, this panel is free of interruptions and is ideally suited for carrying advertising matter and markings identifying the commodity within the package.

Having thus generally described the invention, it will now be referred to in greater detail by reference to the accompanying drawings, illustrating preferred embodiments of the invention, and in which:

FIGURE 1 is a perspective view of an apparatus according to this invention;

FIGURE 2 is a top plan view of the apparatus of FIGURE 1 with certain portions of the overall elevator assembly removed for a clearer view;

FIGURE 3 is a vertical longitudinal cross section taken along the line 3—3 of FIGURE 2 illustrating a portion of the paper feeding assembly;

FIGURE 4 is a vertical transverse sectional view of a portion of the paper advancing means of the paper feeding assembly;

FIGURE 5 is an enlarged vertical sectional view of a component of the paper feeding assembly;

FIGURE 6 is a top plan view showing the advancing mechanism for the paper feeding assembly;

FIGURE 6a is a vertical cross section taken along the line 6a—6a of FIGURE 6;

FIGURE 7 is a vertical cross section taken along the line 7—7 of FIGURE 6;

FIGURE 8 is a vertical longitudinal cross section of the apparatus shown in FIGURE 1;

FIGURE 9 is an enlarged vertical transverse cross section taken along the line 9—9 of FIGURE 8 illustrating the mechanism for advancing a partially wrapped commodity from the elevator assembly at the lower platform;

FIGURE 10 is a detailed perspective view of the component adapted to juxtapose a pair of side flaps and a top flap of the sheet-wrapping material to the commodity;

FIGURE 14 is a transverse vertical cross section taken along the line 14—14 of FIGURE 8 illustrating a portion of the elevator assembly in conjunction with the commodity advancing assembly;

FIGURE 14a is a respective view of a modified form of the "box" down through which the elevator assembly carries the commodity;

FIGURE 15 is an enlarged vertical cross sectional view of a portion of the commodity advancing assembly;

FIGURE 16 is a detailed plan view, partially in section, further illustrating the construction of the commodity advancing assembly;

FIGURE 17 is an enlarged fragmentary plan view partially in section, illustrating the elevator assembly drive means;

FIGURE 18 is a longitudinal vertical view of the terminal end of the guide channel and the lower portion of the elevator assembly;

FIGURE 19 is a transverse vertical cross section of the the front feed end of the elevator assembly shown in FIGURE 18;

FIGURE 20 is a transverse vertical cross section of the middle portion of the elevator assembly showing the package-retaining means;

FIGURE 21 is a perspective view showing the position of the commodity on the sheet wrapping material before the wrapping operation begins;

FIGURE 21a is similar to FIGURE 21 and shows a modified wrapping sheet;

FIGURE 22 illustrates the first step in the method of the application in which the sheet wrapping material is juxtaposed to the four sides of the commodity;

FIGURE 23 illustrates the next step in which a top flap is applied to the top of the commodity;

FIGURE 24 illustrates the next step in which the two rear corner webs of the wrapping material are juxtaposed to side walls of the commodity;

FIGURE 25 is a top plan view of the partially wrapped commodity shown in FIGURE 22;

FIGURE 26 is a rear respective view of the partially wrapped commodity shown in FIGURE 24;

FIGURE 27 is an enlarged section taken along the line 27—27 in FIGURE 24;

FIGURE 28 shows the next step in the method following that of FIGURE 24 in which the front corner webs and the other top panels are juxtaposed to the respective sides and top of the commodity;

FIGURE 29 is a front vertical view of the commodity resulting from the step shown in FIGURE 28, shown as it passes through a glue assembly;

FIGURE 30 is a partial top plan view of the commodity shown in FIGURE 28;

FIGURE 31 illustrates how the top side flaps are juxtaposed to the side walls of the commodity;

FIGURE 32 illustrates the finished bundle; and

FIGURE 33 illustrates the method of removing the commodity from the bundle.

Figure 11:
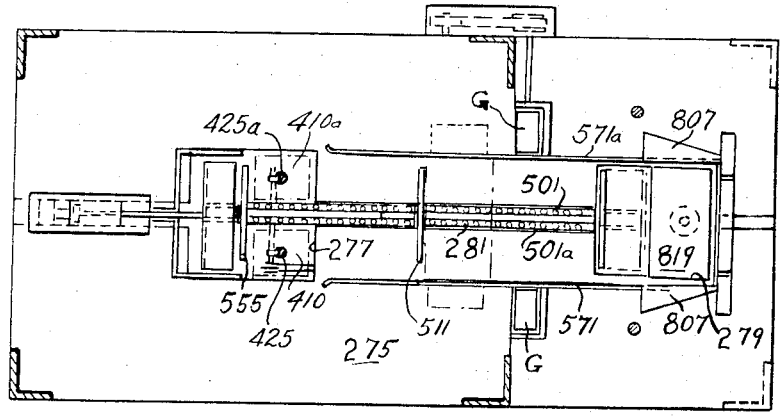
FIGURE 11 is a horizontal cross section taken along the line 11—11 of FIGURE 8 illustrating the lower platform and several of the components it mounts.

Reference will be made to the individual compounds of the apparatus shown in the diagram for the sake of simplicity.

*Upper platform*

The upper platform serves to indirectly or directly mount several of the assemblies of the apparatus, including the pusher P of the elevator assembly, the paper feeding assembly, the loader assembly L, etc. Particular reference is made to FIGURES 1, 2, 4, 8 and 14.

More particularly, the upper platform is associated with a lower platform, designated by reference numerals 601 and 275 respectively, both of which are mounted on a vertical parallel relationship by means of frame members 51 and 51a. The upper platform 601 comprises a rectangular supporting surface 601a and includes a central rectangular aperture 603 therein and supports 418 thereon mounting a portion of the elevator assembly frame 416 in registry over aperture 603, both of which will be described in detail later with regard to the elevator assembly.

Surrounding aperture 603 on all sides thereof are downwardly extending vertical guide plates 605 (FIGURES 8 and 14) connected to the underside of the upper platform 601 by brackets 607. The guide plates 605 extend to a point above the lower platform 275, and are slightly curved, as at 605a, at their juncture to the upper platform 601, for a purpose which will be subsequently described.

The platform 601 is adapted to operate in conjunction with the paper feeding assembly. To this end, the platform 601 includes a pair of laterally spaced apart guides 615 rigidly mounted on either lateral side of aperture 603 to define a wrapping material receiving area. A pair of gripping clamps 611 are mounted on platform 601 on one longitudinal side of the aperture 603, defining the terminal point of advancement of the wrapping paper blank advanced by the paper feeding assembly to the wrapping material receiving area. The purpose and nature of clamps 611 and guides 615 will be discussed in greater detail with reference to the paper feeding assembly.

*Lower platform*

The lower platform comprises a rectangular supporting surface 275 indirectly or directly mounting several additional components of the apparatus including the elevator assembly K, the commodity-advancing means, gluing means, etc., all of which will be subsequently described in detail. Reference now is made to FIGURES 8, 11 and 14.

The lower platform 275 is horizontally mounted on frame members 51, and supports frame members 51a. It includes a rectangular aperture 277 therein in registry with aperture 603 of the upper platform 601. The function of aperture 277 will be discussed with regard to the elevator assembly K. The platform 275 also includes a second rectangular aperture, spaced from aperture 277, the function of which will be described with regard to the elevator assembly. Joining the two apertures 277 and 279 is a third elongated aperture 281, to be discussed with regard to the commodity advancing assembly.

*Conveyor assembly*

This assembly serves to transport a commodity, which may be a plurality of separate articles grouped to form an array A as shown in the drawings, from a previous operation (for example packaging) to a loader component L. Reference will be made to FIGURES 1 and 2 of the drawings.

In more detail, the conveyor assembly comprises a conveyor 201 mounted on supporting leg 203 resting on the floor R. The conveyor 201 terminates (in the forward direction of movement) at a supporting surface 301 forming part of the loader assembly L. Suitable means (not shown) are provided to drive the conveyor 201.

Operating in conjunction with the conveyor 201, and the loader assembly L, is a laterally reciprocating barrier 205, located at the terminal end of conveyor 201 on supporting surface 301. The barrier 205 is adapted to move transversely to the conveyor 201, whereby when the conveyor delivers an array A to the supporting surface 301 of the loader assembly L, additional arrays are prevented from entering the loader assembly L. Any suitable means, generally known for such purposes, for reciprocating the barrier 205 may be provided. Thus, a limit switch 205a (FIGURE 2) may activate a piston, which in turn reciprocates the barrier 205.

*Paper feeding assembly*

This component serves to supply individual sheets of creased material to the wrapping material receiving area defined by guides 615 and clamps 611 of the upper platform 601 and in registry with the aperture 603. Specific reference will be made to FIGURES 1 to 7.

According to the embodiment shown in the drawings, this component includes a supporting surface 101, a lateral extension of the upper platform 601, which is supported by a leg 103 resting on the floor R. A pair of transverse guides 105 and 105a and a lateral guide 107 on its surface define therebetween an area to place a supply of sheet material for wrapping the commodity. The guides 105 and 105a, and 107 are mounted by means of posts 109.

A first shaft 115, carrying a plurality of creasing rollers 117 (depending on the number of creases desired) is rotatably mounted at both ends thereof in a pair of bushings 119, which in turn, are mounted in a pair of spaced apart end frames 111 connected to a sub-frame member 73 of the apparatus. The end frames 111 are joined by a cross member 125. The bushings 119 are spring-loaded in their respective frames 111 by springs 121 and bolts 123. Mounted and depending from crossmember 125 (FIGURES 2 and 3) are a plurality of vertical guide plates 118, terminating a slight distance above the surface 101, which prevent the sheet wrapping material, as it is fed to the elevator platform (as subsequently described) from warping as it proceeds through the scoring mechanism.

Cooperating with the first shaft 115 is a second shaft 129, located beneath the supporting surface 101 and rotatably journalled in bushings 131 mounted on the sub-frame member 73 (FIGURE 3). The shaft 129 mounts a plurality of rollers 133, protruding through the apertures in the supporting surface 101, each mating with a roller 117 mounted on the first shaft 115. Each shaft 115 and 129 carries a toothed gear 135, meshing with one another. By adjusting the spring loaded shaft 115, different tensions for different degrees of creasing (depending on the type of wrapping material) can be exerted on a sheet of wrapping material W (shown in phantom lines in FIGURE 3) as it passes between the rollers.

The shaft 129, protruding at one end through one bushing 131, is connected to a flywheel 137 mounted to an endless belt 127, driven by an electric motor 128 via a slipping clutch (not shown).

Means for advancing a single sheet of wrapping material W from the supporting surface 101 into the wrapping material receiving area defined by guides 615 and clamps 611 (and in registry with aperture 603) of the upper platform 601, are shown in detail in FIGURES 4 to 7. The advancing means includes a pair of parallel endless chain belts 141 and 141a operating in conjunction with cooperating rotatable shafts 115 and 129. Endless belts 141 and 141a located beneath supporting surface 101, operate in transverse channels 151 and 151a therein. Both shafts 115 and 129 include cooperating rollers 139. The upper rollers 139 is associated with a device (not illustrated) for feeding glue onto the upper roller. The rollers 139 cooperate with belts 141 and 141a to push forward a sheet W of wrapping material through the scoring mechanism into the wrapping material receiving area. If desired a further pair of rollers 139 can be provided adjacent the other ends of the shafts 115 and 129 for gluing the underside of the sheet W.

The endless chain belts 141 and 141a are mounted on sprockets 143 and 144, which in turn, are journalled by part shafts 145 and driven shaft 146 respectively and are rotatably mounted in frame number 147. Shaft 146 is driven by any suitable means (not shown) thereby driving the belts 141 and 141a in unison. Mounted in transverse parallel relationship on each belt 141 and 141a, are a pair of abutments 149 (FIGURE 5), extending through channels 151 and 151a located in supporting surface 101 to a point just above its surface. The abutments 149 are pivoted at points 155 to the chains 141 and 141a. Annular slots 153 in the abutments are adapted to slidably engage stubs 157 mounted on the chains 141 and 141a located beneath and mounted to the underside of the supporting surface 101, in each channel 151 and 151a, are rigid platforms 159 extending substantially the length of surface 101, as shown in FIGURES 6, 6a and 7. When the abutments 149, driven by belts 141 and 141a, abut the end of platform 159, they will be placed in an operative position where they protrude slightly above the surface 101, as shown in FIGURES 4 and 5, and be in a position to engage a wrapping blank W.

The guide plates 118, mounted on the crossbar, may be vertically adjusted. A timing device 116 is mounted on one of the guide means, controlling the scoring mechanism. Single sheets of wrapping material are placed on the surface 101 by an operative. The clamps 611 operate in conjunction with a spring loaded flap 640 and two air nozzles 641 (see FIGURES 2 and 8). The flap 640 is mounted on the platform 601 in the path that arrays A follow as they are fed into the apparatus. The flap 640 has one edge hingedly secured to the platform 601 and is spring urged upwardly so that it assumes an inclined position with its other edge above the platform 601. The air nozzles 641 are above the platform 601 and are pointed downwardly so that streams of air are directed onto the top surface of a sheet of wrapping material as it is propelled towards the clamps 611.

*Loader assembly*

The loader L operates in association with the conveyor assembly and elevator assembly. The purpose of this assembly is to advance a commodity A received from the conveyor, which in the drawings is an array of separate articles to be bundled together in a single bundle, onto the supporting surfaces of the elevator assembly in a manner described hereinafter. Particular reference will be made to FIGURES 1 and 2.

More specifically, the loader L includes a platform 301 which receives commodity A from the conveyor 201 previously described. Platform 301, a lateral extension of the upper platform 601 mounts pneumatic cylinder 303 which in turn, operates a piston rod 315 provided with a vertical pushing plate 307.

A pair of lateral vertically positioned opposed guide plates 309 and 311 define therebetween a guide channel extending from the platform 301 to the elevator assembly. Guide plate 309 extends from the initial or forward position of the piston rod 315 to the terminal end of the advancement of the array A. It also serves as a guide to align the array A deliverd to the supporting surface 301 for the pushing plate 307. Guide plate 311 extends from the terminal position of conveyor 201 (on the side adjacent the supporting surface 601) to an abutting plate 321. In addition, guide plate 311 has a curved end portion 311a, running parallel to the conveyor 201, the purpose of which is to align the array A as it is pushed on to the supporting surface 301.

Guide plates 309, 311 and 321, mounted above supporting surface and upper platform 601, are rigidly connected to supports 318 of a supporting frame work 416 (FIGURE 1), which in turn, is supported by posts 418 on the upper platform 601. The outside surface of the plate 311 (and if a second pair of rollers 139 is provided, the plate 309) can be provided with plates of glue repelling synthetic plastic material. This prevents an accumulation of glue developing on the sides of the plates 309 and 311.

As shown in FIGURE 2, and according to a preferred embodiment of this invention, the guide plates 309 and 311 converge so as to compress the bundles. The array A is forced by piston rod 315 and pushing plate 307 through the converging guide channel defined by guide plates 309 and 311 into operative association with the elevator assembly where it is retained under compression.

*Elevator assembly*

The elevator assembly includes co-acting elements consisting of a moveable platform component generally indicated by reference numeral K and a pusher generally indicated by reference numeral P (FIGURE 8). These components operate in unison to lower a commodity positioned on a sheet of wrapping material from the upper platform 601 to the lower platform 275 while simultaneously juxtaposing the wrapping material against at least two of its sides. In describing this assembly, reference will be made to FIGURES 1, 2, 8, 10, 14 and 17.

The platform component K comprises a pair of spaced apart supporting surfaces 410 adapted to reciprocate in unison between aperture 603 of the upper platform 601 and aperture 277 of the lower platform 275. The gap between the supporting surfaces 410 corresponds substantially in width to the width of the elongated aperture 281 of the lower platform 275, so that when the supporting surfaces 410 are in aperture 277 (the lower position flush with the lower platform 275), the distance therebetween forms an extension of the elongated aperture 281.

Each supporting surface 410 is rigidly connected to the terminal plate 431 of a pair of moveable racks 425 and 425a. The racks 425 and 425a, journalled in a frame member 63, vertically reciprocate in unison by the rotation of a shaft 433 provided with a pair of pinions 435, and rotatably journalled in a pair of supports 437. The supports 437 are mounted on an extension 61 of the frame of the apparatus. Each pinion 435 of shaft 433 meshes with one of the racks 425.

Drive means for rotating the shaft 433 includes a pneumatic cylinder 451 (FIGURE 8) operating a toothed piston rod 453. The toothed piston rod 453 is slidably mounted on a frame member 65 which in turn, is rigidly connected to frame member 63 by a bracket 64. One end of the shaft 433, denoted by reference numeral 433a, protrudes beyond one of the supports 437 and mounts a toothed gear 455, which meshes with the toothed piston rod 453. The toothed piston rod 453, activated in a manner hereinafter described, reciprocates in cylinder 451, alternately rotating the shaft 433 in a first direction to lower the supporting surfaces 410 from the upper platform 601 to the lower platform 275 and, reciprocating in the reverse direction, rotates the shaft 433 to raise the supporting surfaces 410 from the lower platform 275 to the upper platform 601.

The pusher component P includes a supporting framework 416 (FIGURE 8) mounted by posts 418 to the upper platform 601. The framework 416 mounts an upright pneumatic cylinder 420, within which operates a vertically reciprocating piston rod 422. Piston rod 422, provided with head plate 423, rigidly mounts a pushing surface 424 in alignment with and spaced a distance slightly exceeding the height of an array A, from the supporting surfaces 410.

The pusher component P is operated by a limit switch (not shown) which in turn, is activated by the piston rod 315 and pushing plate 307 of the loader assembly L on the terminal end of the latter stroke. The platform component K is also simultaneously activated by the loader assembly L through suitable means such as that just described with respect to the pusher P.

When activated, the pusher component P abuts the top surface of an array A to retain the array in alignment as the supporting surfaces 410 descend from the upper platform 601 to the lower platform 275. Guides 605, mounted on the lower surface of platform 601 surrounding aperture 603, function to juxtapose the wrapping material to the respective sides of the array A. A pair of vertically mounted moveable guide rods 455 and 455a, journalled in supporting framework 416 by means of bearings 456, are connected at one end thereof by rings 452 to the pushing plate 424, and serve to guide and position the moveable plate 424 when reciprocating during its stroke.

The coacting components P and K, from the above description, operate to lower an array A positioned on a sheet of wrapping paper W on supporting surfaces 410 from the upper platform 601 to the lower platform 275 while subjecting the array A and wrapping material W to the guides 605 thereby to juxtapose the wrapping material W against the side of the array A. There are guide plates 605 on every side of the array A as it is lowered on the elevator. These plates do not extend to form corners with adjacent plates since allowance must be made for the pleats formed by the wrapping paper W at the corners.

The modified arrangement illustrated in FIGURE 14a includes four guide plates 630 and 631 together defining the vertical channel down through which the array A is carried. Four rollers 632 are mounted on the interior surfaces of the plates but outside the vertical channel defined by plates 630 and 631. Each roller 632 is free to rotate about a horizontal axis and is mounted by means which have been omitted to avoid overburdening the drawing. It will be understood that the edges of the plates 630 are slightly spaced from the adjacent parts of the plates 631 to allow for the pleats formed at the corners of the wrapping material to project beyond the plates 630 to the region of the rollers 632.

The plates 630 are cut away at 633 for a purpose to be described hereinafter.

*Advancing assembly*

The advancing assembly broadly includes three main components: an endless belt, a tucking assembly, and a guideway or channel (located on the lower platform 275) through which the endless belt passes and advances a partially wrapped commodity from the elevator assembly K to the elevator assembly E. In describing this assembly, reference will be made to FIGURES 8 to 16 of the drawings.

The individual components of this mechanism are mounted on various sub-frame members, indicated by reference numerals 57 and 59 which in turn, are connected to the main frame 51.

The endless belt includes a pair of parallel identical chains denoted by the reference numerals 501 and 501a operating in unison and mounting a plurality of spaced apart pivotable hinges indicated generally by numeral 511 (as described hereinafter). The chains 501 and 501a, mounted on four pairs of sprockets 503, 504, 506 and 507 (FIGURES 8 and 12), define a quadrangular path of travel beneath the lower platform 275, the upper portion of the path running parallel to and in registry with the elongated aperture 281 and extending from aperture 277 to aperture 279 of the lower platform 275.

As described hereinafter, one of the sprockets 503 serves to drive chain 501, the other sprocket of this pair to drive chain 501a. Similarly, the chain 501 is also driven by one of the sprockets of the pair 504 and the chain 501a is driven by the other sprocket of that pair. These sprockets are mounted on shafts 515 and 516 which in turn are rotatably journalled in extensions 525 of frame member 57 in a diagonally disposed relationship. Sprocket pairs 505 and 506 are similarly journalled on shafts rotatably mounted in extensions 526 of frame member 57.

Figure 12:
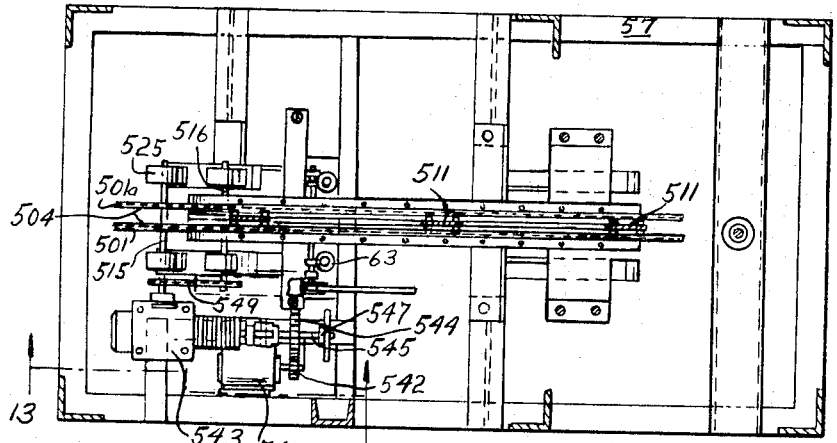
FIGURE 12 is a horizontal section taken along the line 12—12 of FIGURE 8 illustrating the drive mechanism for the commodity advancing means.
Figure 13:
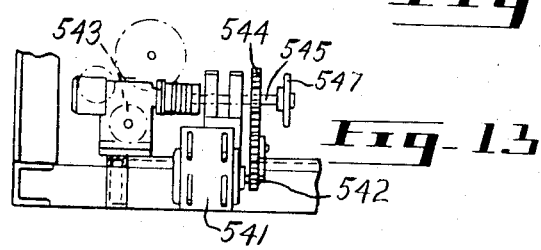
FIGURE 13 is a vertical longitudinal cross section taken along the line 13—13 of FIGURE 12 illustrating, in part, the drive mechanism for the commodity advancing assembly.

The drive means for the advancing assembly may be seen by reference to FIGURES 12 and 13. It includes an electric motor 541 connected to a toothed gear 542, which in turn drives a meshing gear 544 mounted on a drive shaft 545. One end of shaft 545 is connected to a speed reducing unit 543, the other to a handle 547. The speed reducing unit 543 is connected to the shaft 515 mounting sprockets 504. Shafts 515 and 516 each mounts a further sprocket, which in turn mounts a chain 549. Thus the speed reducer 543 (operated by electric motor 541) drives both shafts 515 and 516, turning both pairs of sprockets 504 and 503 simultaneously, which in turn, simultaneously drives the chains 501 and 501a. Handle 547 will permit manual movement—i.e., rotation of shaft 545 for minor forward to reverse adjustments of the advancing assemblies for alignment purposes in adjusting the apparatus for "starting up" procedures.

Beneath aperture 281 of lower platform 275 and in registry therewith are a pair of longitudinally running vertically spaced-apart guides 561 and 561a (FIGURES 8 and 15), curving at one end in the rear of aperture 277 of lower platform 275 to attach to extension member 525 as at 562 and, at the other end, to extension member 526. Guides 561 and 561a are joined together with a cross member 564 by bolts 565. The two guide members 561 and 561a, at the edges, are connected to guide members 563 and 563a by means of stay bolts 567 separated by spacers forming a guide channel therebetween beneath the surface of lower platform 275 through which the chains 501 and 501a pass.

The endless chains 501 and 501a mount a plurality of longitudinally spaced-apart hinges 511 pivotably seated on a rod 553 rigidly journalled in parallel opposed links 501' and 501a' of the respective chains. The hinges 511 include a "keel" portion of 551 extending above and below the pivot. The upper portion of the keel 551 mounts a push plate 555, rigidly connected thereto by bolts 556. The lower portion of the keel is tapered, and mounts a pair of rotatable rollers 559. Horizontal guide plates 563 also mount small vertically disposed rollers 558 which guide the keel portion 551 of the hinge 511.

The chains 501 and 501a carrying hinges 511 passing through the channel defined by guides 561 and 562 cause the rollers 559 of the lower portion of the hinges 511 to strike the guide track formed by guides 561 and 563 at the point where the guide track curves and runs parallel to the lower platform 275. The push plate 555 of the hinges 511 is thus forced into a vertical position as the rollers are advanced through the guide track extending from aperture 277, through the opening of the spaced-apart supporting surfaces 410 along the guide track beneath aperture 271 to the elevator assembly E.

Vertically mounted on the lower platform 275 are a pair of spaced-apart panels 571 and 571a defining therebetween a vertical guide channel extending from the terminal portion 277 of the elevator surfaces 410 and 410a in the forward direction of movement of the array A to the elevator assembly E (FIGURE 11). The guide panels 571 and 571a are tapered to converge to the elevator assembly E at their terminal end (FIGURE 18), the purpose of which will subsequently be discussed with reference to the elevator assembly E.

Operating in conjunction with the commodity advancing means is a "tucking" component shown in detail in FIGURE 10 adapted to juxtapose a top flap and a pair of rear corner pleats of the partially wrapped array A to the top and respective sides of the array A. This component includes a pair of vertically connected aligned pistons 475 and 477, the latter of which is connected to an L-shaped bracket 478 rigidly mounted to the lower platform 275. The pistons 475 and 477 operate piston rods 479 and 481 respectively. Connected to a piston rod 479 is an L-shaped angle bracket 483 which, when advanced, is adapted to juxtapose a top rear flap of the partially wrapped array to the top of the array. Piston rod 481 mounts a U-shaped bracket 485 which, when advanced, is adapted to juxtapose a pair of rear corner pleats to the respective sides of the partically wrapped array.

The pistons 475 and 477 operate in conjunction with one another by suitable means whereby the L-shaped bracket 483 juxtaposes the top flap of the wrapping material to the top of the commodity while piston rod 481, with bracket 485, substantially simultaneously juxtaposes the rear side webs. Thus, for example, a cam lever operated by the initial movement of the forward stroke of piston 475 will suffice. Alternately, a delayed action air valve in the air line supplying piston 477 may be used.

Mounted in conjunction with the vertically disposed side flaps 571 and 571a is a ceiling guide 291. Ceiling guide 291 is mounted so as to just clear the partially packaged array A, and juxtapose the front vertically extending flap against the top of the array in a manner to be described later. The ceiling guide 291 is substantially wider than the channel formed by the side panels in order to control the whole width of the top flap.

Operating in conjunction with the commodity-advancing means is a glue assembly G adapted to apply glue to certain flaps of the wrapping material. Specifically, the glue assembly G comprises a rotatable roller 293 horizontally disposed in a glue bath 295. Resilient flap 297 (FIGURE 18) extends from the ceiling guide 291 to press the horizontally extending flaps onto the glue rollers. The roller 293 is driven by a chain 294 connected to suitable drive means (not shown).

*Elevator assembly*

An elevator assembly generally identified as E is adapted to receive an almost completely wrapped commodity from the commodity advancing means after it passes through the guide channel defined by panels 571, 571a and 291. Reference will be made to FIGURES 1, 8, 11 and 18 to 20 in describing this assembly.

The elevator assembly E, in greater detail, includes a pneumatic cylinder 811 mounted against lower platform 275 and in alignment with aperture 279 thereof. Cylinder 811 operates a vertically reciprocating piston rod 815, which in turn mounts a supporting surface 819 of a dimension slightly less than that of aperture 279.

Mounted on lower platform 275 in registry with aperture 279 and in operative association to the supporting surface 819 of piston rod 815 is a rectangular commodity-retaining enclosure 804 having a discharge opening identified by reference numeral 803. More particularly, the enclosure 804 is composed of a hollow top and bottom open-ended frame 800, mounted to the surface of the lower platform 275 and substantially closed in by panels 801 on all sides thereof. One side of the bottom 805 opens into the guide channel defined by guide plates 575 and 575a to permit a substantially wrapped array to advance onto the supporting surface 819. The bottom portion of the rectangular elevator shaft 804 on either longitudinal side thereof mounts a pair of curved converging panels 807, which form a continuation of panels 801 of the rectangular enclosure and guides 575 and 575a.

The rectangular enclosure 804, as shown in FIGURE 20, is provided with means to retain the array as it is pushed up into the rectangular enclosure 804 by the supporting surface 819 of the elevator. The retaining means is composed of several pairs of opposed cooperating surfaces 821a, 821b and 821c, operated in unison by means of a bell crank lever 823. Each pair of gripping surfaces 821a is joined by a spring loaded connecting rod 825; all of the rods 825 being joined and operated in unison by connecting rod 827. A plurality of rollers 851, mounted to a support 69, are adapted to facilitate the elevation of a wrapped commodity A into the enclosure 804 as it is pushed up by the elevator.

The commodity delivered to the elevator is lifted thereby to the level of the first locking surfaces 821a by the elevator platform 819. The distance between opposed pairs of surfaces 821a is normally less than the length of the package A. However, since the plates 821a are connected to bell cranks 823 and 824 which in turn are journalled in the bearings 818, the plates are pushed upwardly thus allowing the package to wedge between them. The elevator platform 819 then lowers to the level of platform 275 with the wrapped commodity A being suspended in the rectangular enclosure 804.

The gravitational force exerted by a commodity A, contained in the rectangular enclosure 804 acts against plates 821a, which in turns, transmits this force to bell crank 823. In turn, bell crank 823 rotates a bell crank 824 by means of a connecting rod 825 working against a spring 828 connected at one end to a rigid brace 827. Thus, the bell crank 824 transmits its torque into a reaction force against the wrapped commodity A retaining it in a suspended position.

As the subsequent package is pushed upwardly by the elevator platform 817, the first package is then pushed into a level between pairs of plates 821b causing the new pair to go through the same action simultaneously with the plates 821a which are now acting upon the second package. This continues in an upward direction for the whole length of the rectangular enclosure 804.

*Wrapping method and resulting commodity*

FIGURES 21 through 32 illustrate the various forms the commodity takes in the step-by-step method by which it is wrapped, as accomplished by the apparatus just described. In describing these figures, reference will be made to the various assemblies and components of the apparatus to facilitate understanding. As previously described, the form of the commodity A shown in the drawings is a plurality of individual packages assembled to form an array. Thus, it will be understood that this description is only an exemplification of the invention, and is not intended to be limiting in any manner.

The sheet of wrapping material includes crease lines 909, 931, 911 and 925 to facilitate wrapping, dividing the sheet S into five panels, and includes tear tape 923 and slits 927 on either side of the terminal ends of the tear tape. The crease lines 909, 931, 911 and 925 are made in the sheets of wrapping material by cooperating crease rollers 117 and 133 of the paper feeding assembly as the individual sheets are fed to the upper platform 601 by the latter assembly.

The panels 907 and 913, defined by crease lines 909 and 931, and 911 and 925 respectively, have identical widths corresponding to the height of the commodity A; panel 901 defined by crease lines 931 and 911, has a width corresponding to the width of the commodity; and the panels 905 and 917, defined by crease lines 909 and 925 and the respective ends of the sheet S have a combined width greater than the width of the commodity. The overall width of the sheet in this embodiment is less than the combined length and twice the height of the commodity and the overall length more than the combined length of the top, bottom and sides of the commodity.

FIGURE 21 illustrates the position assumed by the commodity A on a sheet S of wrapping material, when the commodity A is advanced and aligned on it by the leader assembly L in the first step. The commodity is centered on the panel defined by crease lines 931 and 911 leaving on either side a pair of longitudinal side panels 901 and 901a, each having a width slightly less than the height of the commodity.

In the subsequent step, the panels 907, 901, 901a and 913 are juxtaposed to the respective sides of the commodity A and assume the form shown in FIGURES 22 and 25. This is accomplished by means of the opposed pairs of plates 605 of the upper platform, which act on the commodity and the wrapping material as the commodity is lowered from the upper platform 605 to the lower platform 275. In juxtaposing the respective side panels to the sides of the commodity, front and rear corner flaps 927 and 929 respectively are formed by the spaced-apart plates 605. In this respect, it will also be noted that panels 905 and 915 connected to panels 907 and 913 respectively, extend in a substantially vertical position from the latter, when the elevator is at the lower platform 275. When the modified construction of FIGURE 14a is employed, the corner flaps 927 and 929, which project from the vertical channel through the gap between the plates 630 and 631, pass between the plates 631 and the rollers 632. The rollers 632 are mounted sufficiently close to the plates 631 to cause the folds at the outermost ends of the pleats to be pressed so that these folds become sharp.

Following this, the rear panel 905 is subsequently juxtaposed to the top of the commodity A to assume the form shown in FIGURE 23. This step is carried out by means of the piston assembly 475 and L-shaped bracket 483. At this stage, the top panel 905 protrudes beyond the respective top transverse sides of the commodity A forming a pair of equal top transverse side panels each having a width at least equal to or greater than the portion of the transverse sides of the commodity not covered by the side panels 901 and 901a.

Substantially simultaneous with the juxtaposition of panel 905 to the top of the commodity A, rear flaps 929 are juxtaposed to the side panels 901 and 901a of the commodity to form the partially wrapped commodity shown in FIGURES 24, 26 and 27. This latter step is carried out by the piston assembly 477 and U-shaped bracket 485 of this assembly. A gate member 585 is provided which projects into the path of the commodity while the rear flaps 929 and rear panel 905 are being juxtaposed to the side panels 901 and 901a, and the top respectively. This prevents any movement of the commodity under the influence of brackets 483 and 485. The gate 585 operates through piston 587 which lowers it upon the arrival of a commodity at the lower platform (e.g., through a limit switch) and raises it once the folding operations have been completed. The gate is returned in an inoperative position before the commodity is entrained by one of the push plates 555.

In the following step, the panel 917 and front corner flaps 927 are juxtaposed to the top of the commodity and side panels 901 and 901a, respectively. These two operations are carried out substantially simultaneously as the partially wrapped commodity is advanced through the guide channel by the commodity advancing means, and specifically by the horizontal plate 291 and opposed pairs of vertical plates 571 of the guide channel acting on the respective panels. At this stage, the top panel 917 forms a pair of front top transverse side panels extending on either side of the commodity A, designated by reference numerals 917a and as shown in FIGURES 28, 29 and 30. As the length of the sheet of wrapping material S is longer than the total length of the sides, top and bottom of the array, top panel 917 overlaps top panel 905. Either one or both top panels 905 and 917 may carry adhesive whereby when they are juxtaposed, they are bonded together.

In the next step, both front and rear pairs of top transverse side panels are folded in towards the respective sides of the commodity—that is, towards corner panels 927 and 929 and side panel 901. This is performed by both pairs of the top transverse side panels passing over the glue assembly G, where they receive a coating of glue (see FIGURE 31), and the cooperating components of the elevator assembly E. Specifically, both pairs of top side panels pass through aperture 805 of the elevator assembly as the commodity is advanced into operative association with the latter by means of commodity-advancing means, and folded down by guide plate 807.

In the final step, both pairs of top side panels are securely juxtaposed to the respective sides of the commodity by means of guide plates 807 as the commodity is advanced into the enclosure 804 by the elevator 819, to assure a strong bond.

The resulting package of this invention is illustrated in FIGURE 32. To remove the commodity A from the package, the tear tape 923 is ripped at one end of the front panel 917a (by means of lifting the area defined by the slit portions) and pulling the tear tape thus exposing the commodity A, in the manner shown in FIGURE 33.

*Operation*

The above described apparatus is operated in intermittent timed-related sequence, as will be herein described. Prior to operation, a supply of wrapping material, such a precut sheets of kraft paper, is placed on a suitable supporting surface near the surface 101. An operative places a sheet in the area defined by guides 105, 105a and 107 each time that the preceding sheet has been fed forward by the abutments 149. At the beginning of the intermittent timed-related sequence, the supporting platform 410 of the elevator assembly is at the upper station.

The conveyor assembly delivers a single array A to the platform 301 of the loader assembly L where it is positioned thereon by means of the guide 309. Once in position, a limit switch activates the barrier 205 which reciprocates across the path of the conveyor to prevent a further array A from entering the platform 301.

The paper feeding assembly is then activated by the positioning of a commodity A on the platform 301 in conjunction with an electronic eye connected to the loader assembly L. The paper feeding assembly advances a single sheet of wrapping material to and through the creasing rollers 117 and 133 and into the area defined by clamps 611 and guides 615 on the upper platform 601. Clamps 611 are activated by a limit switch operating in conjunction with the advancement of the sheet of wrapping material to grip the sheet and retain it in position. As the sheet approaches the clamps 611 it comes under the influence of the downwardly directed air streams from the nozzles 641. The air streams ensure that the leading edge of the sheet is sufficiently close to the surface of platform 601 to pass beneath the flap 640 and properly to encounter the clamps 611.

Subsequently, the piston 315 is activated by a limit switch, pushing forward a commodity A through the guide channel defined by guides 309 and 311 onto the sheet of wrapping material positioned on supporting surfaces 410 of the elevator assembly. The commodity A, as it is propelled by the plate 307, encounters the flap 640 and presses the flap 640 downwardly into contact with the wrapping sheet against the spring loading of the flap. The flap 640 ensures that the forward edge of the commodity A rides over the clamped edge of the wrapper so that it does not tuck the sheet. The flap 640 springs upwardly when cleared by the commodity A.

On its return stroke, the piston 315 activates, in conjunction with a limit switch, the pusher component and the moveable platform component of the elevator assembly subsequently simultaneously. Thus, piston rod 422 of piston 420 is activated, abutting the top surface of the commodity A positioned on the wrapping material at the same time the piston rod 453 of the piston assembly 451 commences its forward stroke operating to lower the supporting platforms 410 from the upper platform 601 to the lower platform 275. As the platforms 410 begin to descend, the plates 605 break upwardly the panels of wrapping material which project on all sides of the commodity. It will be understood that the free edges of these panels move upwardly as the platforms 410 commence to move downwardly. To prevent the rearmost panel, that is, the panel nearest plate 307 from becoming damaged by encountering the lower edges of the guide plates 309 and 311, these two plates 309 and 311 have appropriately positioned inverted U-shaped cut-outs in the lower edges thereof. The rearmost panel moves upwardly into these cut-outs.

The supporting surfaces 410, when at the lower platform 275, trip a limit switch activating pistons 475 and 477 which push forward the plates 483 and 485 to tuck-in the rear flaps and the top flap against the respective sides and top of the commodity.

The commodity advancing assembly is subsequently activated by means of a limit switch operating in conjunction with the supporting surfaces 410 when at the lower platform 275. More specifically, this limit switch, operating in a time-delayed manner, completes a circuit for the electric motor 541 which serves to drive sprocket pairs 503 and 504 thus advancing simultaneously the chains 501 and 501a. A pusher plate 555 of one hinge 511 connected to the chains 501 and 501a pushes forward a predetermined distance the partially wrapped commodity from the supporting surfaces 410 into the guide channel defined by ceiling guide 291 and sides 571 and 571a.

Once the partially wrapped commodity has been advanced from supporting surface 410 and the hinge 511 is clear of the aperture 277, the supporting surfaces 410 and the pusher component P return to their respective positions at the upper platform 601, which completes the cycle.

It will be understood that the commodities are advanced through the guide channel a predetermined distance during each cycle until they arrive at the elevator assembly E. The elevator assembly E operates a sequence with the above components, and specifically the commodity advancing mechanism so that when a substantially wrapped commodity is placed on the platform 819, the piston assembly 811 elevates the commodity within the enclosure 804.

As previously outlined, the elevator assembly K includes an elevator, the operating stroke of which is in a downward direction and the return or idle stroke is in the upward direction. That is, it lowers the wrapping material and commodity thereon from an upper station to a lower station and performs an idle stroke in the upward direction.

It will be understood from the above description to those skilled in the art, that the components of the apparatus described may vary considerably without departing from the spirit of this invention.

It is contemplated within the scope of this invention that the above-described paper feeding assembly can be of a semiautomatic nature, feeding length of wrapping material, from a continuous roll, to the upper platform with provision being made for cutting the material at predetermined lengths to provide the individual sheets such as is described in copending application Serial No. 465,825.

It will also be understood that in place of the elevator assembly E receiving a substantially wrapped commodity from the commodity advancing assembly, the commodities can be directly removed from the guide channel through which the commodity passes by slightly modifying the guide plate 807 to firmly juxtapose the transverse side panels to the respective sides of the commodity.

The apparatus of this invention lends itself particularly to compression bundling of a plurality of individual packages aligned to form an array, as is shown in the drawings. However, the apparatus is also capable of packaging commodities which are not required to be bundled under compression and the above-described apparatus may be modified accordingly. Specifically, a commodity A, as it is fed onto a sheet of wrapping material does not have to be placed under compression by converging guide plates 309 and 311, and the guide plates can merely serve to align the commodity on the sheet of wrapping material. Similarly the opposed guides 605 which retain the commodity under compression when the commodity is lowered from the upper platform 601 to the lower platform 275 do not have to retain the commodity under compression, but, can merely serve to juxtapose the panels of wrapping material to the commodity.

According to a still further aspect of this invention, it is contemplated that the method and apparatus wrap a commodity in a sheet of corrugated board using the essential features described hereinabove. In using corrugated board the apparatus is modified in the following respects:

(1) One of the two pairs of guide panels 605 is omitted.

(2) The bracket 483 and the operating means therefore are omitted.

(3) Two pairs of ploughs in the form of rods are provided immediately before the elevator assembly E to juxtapose flaps of the corrugated board to the sides of the commodity. The plates 807 are omitted.

The corrugated board blank is substantially the same as the sheet shown in FIGURE 21 except that the crease lines are spaced differently and an extra flap (which forms the so-called manufacturers' joint), having the same width as the array A, is provided. This sheet is illustrated in FIGURE 21a from which it will be seen that four crease lines 950, 951, 952 and 953 are provided to define four panels 954, 955, 956 and 957 and a flap 958. The end parts of the crease lines 950, 951 and 952 are slit. The panel 954 has a width less than the height of the array A, and the combined width of the panels 956 and 957 is equal to the sum of the height and the width of the array A. The flap 958 is glued by a roller equivalent to roller 139 arranged on the shaft 115.

The array A is placed on the sheet in the position illustrated in FIGURE 21a, and as the array and the sheet are lowered from the upper platform 601 to the lower platform 605, the panels 954 and 956 are juxtaposed to the array with the panel 957 projecting above the array.

At the lower station the two rear flaps 954a are juxtaposed to the sides of the array A, and the array is then propelled towards the elevator E. At this time the front flaps 956a are juxtaposed to the sides of the array A, and the panel 957 is juxtaposed to the top of the array A. The flap 958 projects rearwardly of the array A.

The partly wrapped array then encounters the ploughs which are arranged immediately before the elevator E. A pair of ploughs is arranged on each side of the partly wrapped array and each pair consists of an upper plough and a lower plough. The upper plough slopes downwardly towards the elevator E commencing at the level of the top edge of the array and terminating at half the height of the array. The other plough slopes upwardly from the bottom edge of the array to half the array's height. All the ploughs are angled, considered horizontally, with respect to the array and the ploughs, at their ends adjacent the elevator E, are spaced apart by the width of the array. These ploughs juxtapose the flaps 995a and 957a to the sides of the array, the flaps 957a being glued by the arrangement G.

Finally, as the array is urged upwardly at the elevator E, the flap 958 is bent downwardly and pressed against the panel 954.

This invention also contemplates the use of various forms of sheet wrapping material S as it is delivered to the supporting surfaces 410 of the elevator assembly. To this end, depending on the thickness and type of material being used to wrap the commodity, it may not be necessary to crease the wrapping material. Hence, if sufficiently flexible material were used, the crease lines 909, 931, 911 and 925 would not be required and the rollers used to crease the sheet material would not have to be included.

I claim:

1. An apparatus for wrapping a commodity, comprising, a frame, a horizontal elevator platform movable between upper and lower stations mounted on said frame, delivery means for delivering to said platform a sheet wrapper of a size sufficient to wrap the commodity, commodity placing means for placing a commodity in register on the wrapper while it is at rest at the upper station, retaining means for retaining said commodity in register with the wrapper as the elevator descends from the upper to the lower station, means acting as the elevator descends from the upper to the lower station for causing said wrapper to envelope the sides of the commodity and to extend thereabove at two sides in upwardly projecting flaps and sideways in front and rear corner webs, means in advance of and means to the rear of said lower station for juxtaposing said corner webs to the sides of the commodity, means to the rear of the lower station for juxtaposing while the commodity is at rest, one of said flaps to the top of the commodity to provide first and second transverse top flaps extending laterally beyond the commodity, means for moving the commodity horizontally away from said lower station, means for juxtaposing said first and second transverse top flaps to the respective sides of the commodity while the commodity is so moving, and means for actuating said elevator platform, said delivery means and said commodity placing means in intermittent time-related sequence.

2. An apparatus for wrapping a commodity, comprising, a frame, an elevator platform movable between upper and lower stations on said frame, delivery means for delivering to said elevator platform a sheet wrapper, commodity placing means for placing a commodity on top of the wrapper while the elevator platform is at the upper station to leave panels of the wrapper projecting front and rear of the commodity and edge portions of the wrapper projecting laterally of the commodity, means effective for juxtaposing said panels of said wrapper to opposed front and rear sides of the commodity to form front and rear flaps projecting laterally of the commodity and a front panel projecting above the commodity to the rear of said lower station for juxtaposing said rear flaps to sides of the commodity, means for moving the commodity away from said lower station, means effective during such movement of the commodity for juxtaposing said front panel in said front flaps to the top and sides of the commodity respectively with the central part of said front panel projecting beyond the rear of such commodity and edge portions of said front panel projecting laterally of said commodity, further means for juxtaposing said edge portions against the sides of the commodity, and means for breaking downwardly said central part of the front panel to juxtapose this part to the rear of the commodity.

3. An apparatus for wrapping commodities, comprising, a frame, an elevator movable between upper and lower stations mounted on said frame, delivery means for delivering to said elevator a sheet wrapper of a size to wrap a commodity, commodity placing means for placing a commodity on top of the wrapper in register therewith while said elevator is at said upper station, retaining means for retaining said commodity in register with the wrapper as the elevator descends from said upper to said lower station, means acting as the elevator descends from said upper to said lower station for juxtaposing parts of the wrapper front and rear to the sides of said commodity and to form projecting front and rear flaps and front and rear corner webs, means in advance of and means in rear of said lower station for juxtaposing said corner webs to the sides of said commodity, further means in advance of said lower station for juxtaposing said front flap to the top of said commodity, further means in the rear of said lower station for juxtaposing said rear flap to the top of the commodity thereby to provide first and second transverse top flaps extending laterally beyond the upper side edges of the commodity, means for juxtaposing said first and second transverse top flaps to the respective sides of said commodity, and means for operating said elevator, said delivery means and said commodity placing means in intermittent time-related sequence whereby said delivery means delivers a sheet of wrapping material to said elevator, said commodity placing means places a commodity on the sheet of wrapping material and in the above-identified position thereon, said elevator descends between said upper and lower stations and while said means acting as the elevator descends to juxtapose parts of the wrapper to said commodity; and the remaining sides of the wrapper are juxtaposed to the respective sides and top of the commodity.

4. An apparatus, as defined in claim 3, wherein said delivery means delivers a sheet of creased wrapping material to said elevator and comprises a supporting surface in operative relationship to said upper station and having a sheet-wrapping material retaining area adapted to retain a plurality of stacked sheets thereon, cooperating vertically disposed adjustable crease rollers mounted above and below said supporting surface in advance of said sheet wrapping material retaining area, and means for advancing an individual sheet from said sheet wrapping material retaining area to and through said cooperating rollers and into a sheet wrapping material receiving area at said upper station.

5. An apparatus, as defined in claim 3, wherein said means for retaining a sheet of wrapping material at said upper station comprises a pair of spaced-apart parallel guides on either lateral side of said aperture, and gripping means on one longitudinal side of said aperture for retaining a sheet of wrapping material thereon when advanced by the means for delivering a sheet of wrapping material.

6. An apparatus, as defined in claim 3, wherein said elevator includes a pair of transversely spaced-apart horizontal platforms, a pair of vertically disposed racks each mounting one of these pair of platforms, and means for reciprocating said racks in unison through a positive and return stroke.

7. An apparatus, as defined in claim 3, wherein said elevator includes a pair of transversely spaced-apart horizontal platforms, a pair of vertically disposed racks each mounting one of these pair of platforms operative through a positive and return stroke between said upper and lower stations, a rotatable rod mounting a pair of gears each engaging one of said racks, and means for rotating said rotatable rod through said positive and return stroke.

8. An apparatus, as defined in claim 3, wherein said means adapted to juxtapose the rear corner webs and said means adapted to juxtapose the rear top flap to the commodity comprises a piston assembly mounted at said lower station, said assembly including a pair of vertically aligned co-acting pistons, one of said pistons mounting a reciprocating piston rod carrying a spaced-apart pair of vertical fingers adapted to juxtapose the rear webs to the respective sides of the commodity, the other of said pistons mounting a reciprocating piston rod carrying horizontally disposed means adapted to juxtapose the rear top flap to said commodity.

9. An apparatus, as defined in claim 3, wherein said upper and lower stations comprise vertically spaced-apart parallel upper and lower platforms mounted on said frame and each having an aperture therein, each aperture being in registry with the other, and said elevator being moveable between the respective apertures of said upper and lower platforms.

10. An apparatus, as defined in claim 3, including conveying means for delivering a plurality of commodities to said placing means and barrier means between said conveying means and said placing means whereby said commodities are delivered one-by-one into operative relationship with said placing means by said conveying means.

11. An apparatus, as defined in claim 3, wherein said upper and lower stations comprise upper and lower platforms having registering apertures therein, said elevator being operative between said registering apertures, and said retaining means comprises vertically reciprocating means mounted on said upper platform in registry with said apertures, said retaining means being operative in conjunction with said elevator and being adapted to abut and retain a commodity on said elevator.

12. An apparatus, as defined in claim 11, wherein said vertically reciprocating means mounted on said upper platform comprises a frame, a piston assembly vertically mounted thereon, a vertically reciprocating piston rod operable in said assembly and in registry with said apertures, and a horizontal surface connected to said piston rod adapted to contact a commodity on said elevator.

13. An apparatus, as defined in claim 3, wherein said means for juxtaposing said front corner webs to the sides of a commodity and said means for juxtaposing said front flap to the top of a commodity includes a pair of spaced-apart vertical guides and a top horizontal guide defining therebetween a guide channel, and means for advancing a commodity from said elevator to and through said guide channel whereby said vertical guides juxtapose said front cover webs to the respective sides of the commodity and said horizontal guide juxtaposes said front flap to the top of said commodity.

14. An apparatus, as defined in claim 13, wherein said upper and lower stations comprise vertically spaced-apart upper and lower platforms, there being an aperture in said lower platform, said elevator including a pair of spaced-apart supporting surfaces operable between said upper station and said aperture of said lower platform, said lower platform mounting said guide channel, a further aperture in advance of and connected to said first-mentioned aperture and extending to and through said guide channel, and means for advancing a commodity from said elevator to and through said guide channel passing from said first-mentioned aperture between said spaced-apart supporting surfaces through said guide channel.

15. An apparatus, as defined in claim 14, wherein said means for advancing a commodity comprises an endless belt beneath said lower platform, a plurality of spaced-apart hinges on said endless belt each mounting a push plate adapted to contact and push forward a commodity, said hinges being in registry with said apertures of said lower platform whereby said push plates extend above said lower platform, and drive means for operating said endless belt in intermittent timed sequence with said elevator, whereby when said elevator lowers a commodity from said upper station to said lower station said drive means operate said endless belt to push forward a commodity from said elevator into and through said guide channel.

16. An apparatus, as defined in claim 15, including means for receiving and retaining a wrapped commodity advanced to and through said guide channel, said means including a commodity-retaining enclosure with an opening therein in operative association to said guide channel.

17. An apparatus, as defined in claim 16, wherein said commodity-retaining enclosure comprises a vertical open-ended rectangular enclosure adapted to receive and retain a plurality of wrapped commodities, said enclosure having an opening in registry with said guide channel, gripping means within said enclosure adapted to releasably retain a commodity, and means within said enclosure at one end thereof and in operative association with said guide channel adapted to receive and elevate a commodity to said gripping means.

18. In an apparatus for wrapping commodities, means for advancing partly wrapped commodities through a section of the apparatus, the advancing means comprising endless belts, pusher plate means pivotally mounted on said endless belts, cam surfaces on said pusher plate means, and cam plates extending through said section of the apparatus for acting on said cam surfaces to rotate said pusher plate means about their pivotable connections with the belts to bring the pusher plate means into driving engagement with said commodities.

19. In an apparatus for wrapping commodities, means for delivering a sheet of wrapping material to a platform, clamping means gripping one edge of the sheet to retain the material on said platform, a hingedly mounted flap, air nozzle means directing a downwardly air jet onto said material as the material is delivered to said platform to ensure that said edge of the material properly engages said clamping means and passes beneath said flap, and commodity placing means for propelling a commodity along a feed path onto said material, said flap being in said feed path and being overridden by the commodity as the commodity is fed by said propelling means onto said material.

20. A method of bundling a plurality of arrays aligned to form a bundle comprising the steps of placing the array under compression, onto a sheet of substantially rectangular wrapping material and positioning it thereon to leave on each side of said array, and on one longitudinal side of the array a first longitudinal panel of wrapping material at least as large in width as the height of the array and on the other longitudinal side of the array a second longitudinal panel of wrapping material smaller in width than the combined height and width of the array, and juxtaposing, while said array is retained under compression, said side panels and said first and second longitudinal panels to the respective side of the array whereby said first and second longitudinal panels extend above the upper top edges of the array to form longitudinal first and second flaps, and the side and longitudinal panels together form pairs of front and rear corner webs extending from the corners of the array; the rear and front pairs of corner webs to the transverse sides of said array; said first longitudinal flap to the top of said array whereby said flap extends beyond the lateral edges of the array to form a pair of first longitudinal transverse flaps; said longitudinal flap to the top of said bundle whereby said second longitudinal flap extends beyond the lateral edges of the array to form a pair of second transverse flaps and said pairs of first and second longitudinal flaps to the transverse sides of said bundle.

21. An apparatus as defined in claim 3, wherein there is included means for feeding a commodity to a commodity entry station in operable relationship to said commodity placing means, and guide plates extending between said commodity entry station and said commodity placing means, said guide plates inwardly converging from said commodity entry station to said commodity placing means for compressing the commodity as it is advanced from said commodity entry station.

22. An apparatus as defined in claim 21, wherein there is included a conveyor for displacing series of commodities to said entry station, and a pusher assembly acting transversely of said conveyor for advancing a series of commodities through said guide means.

23. A method of wrapping a commodity, comprising, placing said commodity in register on a wrapper of a size to wrap the commodity, moving the commodity in a downward direction through a restricted passage whereby the surplus material of the wrapper is forced upwards against the sides of the commodity to form side panels, front and rear corner webs, and rear top and front top flaps extending above the commodity, halting the movement of the commodity while folding in the rear corner webs and rear top flap into juxtaposition with the respective portions of the commodity, whereby the rear corner webs overlie first panels of the wrapping material juxtaposed to the sides of the commodity when the commodity was moved downwardly through the restricted passage, then advancing the commodity through a horizontal passage having means encountering the front corner webs and front top flap whereby the flaps are folded into juxtaposition with the respective portions of the commodity, by the movement thereof through the passage, and there remains top side flaps extending from the sides of said front top flap, and finally juxtaposing the top side flaps to the respective sides of the commodity over the first side panels and the front and rear corner webs.

24. An apparatus for wrapping a commodity, comprising, a frame, a horizontal elevator platform movable between upper and lower stations mounted on said frame, delivery means for delivering to said platform a sheet wrapper of a size sufficient to wrap the commodity, commodity placing means for placing a commodity in register on the wrapper while it is at rest at the upper station, said commodity remaining in register with the wrapper as the elevator descends from the upper to the lower station, means acting as the elevator descends from the upper to the lower station for causing said wrapper to envelope sides of the commodity and extend thereabove at least at one side in an upwardly projecting flap and sideways in front and rear portions, means in advance of and means to the rear of said lower station for juxtaposing said portions to the sides of the commodity, means at the lower station for juxtaposing said one flap to the top of the commodity to provide first and second transverse top flaps extending laterally beyond the commodity, means for moving the commodity horizontally away from said lower station, means for juxtaposing said first and second transverse top flaps to the respective sides of the commodity while the commodity is so moving, and means for actuating said elevator platform, said delivery means and said commodity placing means in intermittent time-related sequence.

25. An apparatus for wrapping a commodity comprising, a frame, a horizontal elevator platform movable between upper and lower stations mounted on said frame, delivery means for delivering to said platform a sheet wrapper of a size sufficient to wrap the commodity, commodity placing means for placing a commodity in register on the wrapper while it is at rest at the upper station, said commodity remaining in register with the wrapper as the elevator descends from the upper to the lower station, means acting as the elevator descends from the upper to the lower station for causing said wrapper to envelope the sides of the commodity and to extend thereabove at two sides in upwardly projecting flaps and sideways in front and rear corner webs, means in advance of and means to the rear of said lower station for juxtaposing said corner webs to the sides of the commodity, means to the rear of the lower station for juxtaposing while the commodity is at rest one of said flaps to the top of the commodity to provide first and second transverse top flaps extending laterally beyond the commodity, means for moving the commodity horizontally away from said lower station, means for juxtaposing said first and second transverse top flaps to the respective sides of the commodity while the commodity is so moving, and means for actuating said elevator platform, said delivery means and said commodity placing means in intermittent time-related sequence.

26. An apparatus, as defined in claim 24, wherein said means for juxtaposing said portions to the sides of a commodity and said means for juxtaposing said upwardly projecting flap to the top of a commodity includes a pair of spaced-apart vertical guides and a top horizontal guide defining therebetween a guide channel, and means for advancing a commodity from said elevator to and through said guide channel whereby said vertical guides juxtapose said front portions to the respective sides of the commodity and said horizontal guide juxtaposes said upwardly projecting flap to the top of said commodity.

27. An apparatus, as defined in claim 26, wherein said upper and lower stations comprise vertically spaced-apart upper and lower platforms, there being an aperture in said lower platform, said elevator including a pair of spaced-apart supporting surfaces operable between said upper station and said aperture of said lower platform, said lower platform mounting said guide channel, a further aperture in advance of and connected to said first-mentioned aperture and extending to and through said guide channel, and means for advancing a commodity from said elevator to and through said guide channel passing from said first-mentioned aperture between said spaced-apart supporting surfaces through said guide channel, said means for advancing a commodity comprising an endless belt beneath said lower platform, a plurality of spaced-apart hinges on said endless belt each mounting a push plate adapted to contact and push forward a commodity, said hinges being in registry with said aperture of said lower platform wheereby said push plates extend above said lower platform, and drive means for operating said endless belt in intermittent timed sequence with said elevator, whereby when said elevator lowers a commodity from said upper station to said lower station said drive means operates said endless belt to push forward a commodity from said elevator into and through said guide channel.

References Cited
UNITED STATES PATENTS

| | | | |
|---|---|---|---|
| 1,087,413 | 2/1914 | Ward | 53—223 |
| 1,194,492 | 8/1916 | Fischer | 53—32 |
| 1,285,646 | 11/1918 | Drake et al. | 53—223 |
| 1,851,457 | 3/1932 | Smith et al. | |
| 1,727,011 | 9/1933 | Boileau | 53—223 |
| 2,149,400 | 3/1939 | Mazer | 53—207 |
| 3,068,624 | 12/1962 | Linda | 53—124 |

GRANVILLE Y. CUSTER, JR., *Primary Examiner.*

UNITED STATES PATENT OFFICE
CERTIFICATE OF CORRECTION

Patent No. 3,354,600                            November 28, 1967

Wolfgang Hoffmann

It is hereby certified that error appears in the above numbered patent requiring correction and that the said Letters Patent should read as corrected below.

Column 3, line 63, for "respective" read -- perspective --; line 66, for "in" read -- of --; column 9, line 55, for "is" read -- are ----; column 10, line 10, for "partically" read -- partially --; line 37, for "Elevator assembly" read -- Elevator assembly "E" --; line 54, after "opening" insert -- generally --; column 11, line 18, for "turns" read -- turn --; line 69, for "leader" read -- loader --; column 15, line 59, for "995a" read -- 955a --; column 16, line 38, after "commodity" insert --, means --; column 19, line 35, after "said" insert -- second --; column 21, line 11, for "wheereby" read -- whereby --.

Signed and sealed this 29th day of April 1969.

(SEAL)
Attest:

EDWARD M.FLETCHER,JR.
Attesting Officer                            EDWARD J. BRENNER
                                                       Commissioner of Patents